United States Patent
Justus

(10) Patent No.: US 11,087,289 B2
(45) Date of Patent: Aug. 10, 2021

(54) DATABASE AND WEB-BASED INFRASTRUCTURE FOR ENHANCING EVENT-PLANNING TOOLS

(71) Applicant: Charles Robert Justus, Wildwood, MO (US)

(72) Inventor: Charles Robert Justus, Wildwood, MO (US)

(*) Notice: Subject to any disclaimer, the term of this patent is extended or adjusted under 35 U.S.C. 154(b) by 252 days.

(21) Appl. No.: 16/235,717

(22) Filed: Dec. 28, 2018

(65) Prior Publication Data

US 2019/0205840 A1 Jul. 4, 2019

Related U.S. Application Data

(60) Provisional application No. 62/612,867, filed on Jan. 2, 2018.

(51) Int. Cl.
| | |
|---|---|
| *G06F 16/22* | (2019.01) |
| *G06F 16/2457* | (2019.01) |
| *G06F 16/951* | (2019.01) |
| *G06Q 10/10* | (2012.01) |

(52) U.S. Cl.
CPC ..... *G06Q 10/1095* (2013.01); *G06F 16/2282* (2019.01); *G06F 16/24578* (2019.01); *G06F 16/951* (2019.01)

(58) Field of Classification Search
CPC .......... G06F 16/24578; G06F 16/951; G06F 16/211; G06F 16/2282; G06F 16/9535; G06F 16/955; G06Q 10/1095
USPC ............ 707/706, 713, 722, 732, 751, 758
See application file for complete search history.

(56) References Cited

U.S. PATENT DOCUMENTS

| | | | |
|---|---|---|---|
| 5,634,016 A | 5/1997 | Steadham, Jr. et al. | |
| 7,366,990 B2 | 4/2008 | Pitroda | |
| 8,700,540 B1* | 4/2014 | Zambrano | G06F 16/24578 |
| | | | 705/319 |
| 8,812,525 B1* | 8/2014 | Taylor, III | G06Q 10/02 |
| | | | 707/758 |
| 8,924,490 B2 | 12/2014 | Tng | |
| 10,740,832 B2* | 8/2020 | Mehta | G06Q 30/0641 |
| 2003/0125998 A1 | 7/2003 | McKenney et al. | |
| 2011/0145729 A1* | 6/2011 | Shulman | H04L 12/1822 |
| | | | 715/760 |
| 2013/0036369 A1 | 2/2013 | Mitchell et al. | |
| 2013/0073389 A1* | 3/2013 | Heath | G06Q 50/01 |
| | | | 705/14.54 |
| 2013/0159270 A1* | 6/2013 | Urmy | G06Q 10/109 |
| | | | 707/706 |
| 2015/0227856 A1 | 8/2015 | Hoang-To | |

(Continued)

*Primary Examiner* — Dangelino N Gortayo
(74) *Attorney, Agent, or Firm* — Armstrong Teasdale LLP

(57) ABSTRACT

A data controller (DC) computing system for providing event-planning tools, the DC computing system including at least one data controller (DC) computing device is provided. The DC system is configured to electronically receive basic data from a first data source. The DC system is also configured to store the basic data within a database, generate output data based on the basic data, and transmit the output data to a second data source. The DC system is further configured to electronically receive input data from the second data source, wherein the input data is based on a selection of a first user from the output data, generate event data based on the output data, and transmit a report to a second user, wherein the report includes the event data.

20 Claims, 6 Drawing Sheets

(56) References Cited

U.S. PATENT DOCUMENTS

2017/0262927 A1\* 9/2017 Zak .................... G06Q 30/0641
2018/0012165 A1\* 1/2018 Podolsky ......... G06Q 10/06313

\* cited by examiner

DATABASE AND WEB-BASED INFRASTRUCTURE FOR ENHANCING EVENT-PLANNING TOOLS

CROSS-REFERENCE TO RELATED APPLICATIONS

This application is a non-provisional application and claims priority to U.S. Provisional Patent Application Ser. No. 62/612,867, filed Jan. 2, 2018, which is hereby incorporated by reference in its entirety.

BACKGROUND

The field of the disclosure relates generally to enhancing event-planning tools and, more particularly, to networked-based systems and methods for providing event-planning tools.

At least some events require parties who plan these events (i.e., organizers) to identify the type of electrical infrastructure that participants of the event (e.g., food trucks, booths) require. Because participants may offer their goods and/or services using different types of electric platforms, the parties planning these events need to know in advance the types of electric platform that the participants need so that the participants may offer their goods and/or services during the events. However, due to the numerous types of electric platforms and the lack of electric knowledge from most participants, organizers are not provided accurate information as to the participants needs and may not be able to provide the electrical solution to every participant causing participant dissatisfaction and even loss revenue.

Accordingly, there is a need for obtaining accurate electrical platform information and providing enhanced electrical-planning tools.

BRIEF DESCRIPTION

In one aspect, a data controller (DC) system for providing event-planning tools is provided. The DC system includes at least one data controller (DC) computing device that includes a processor communicatively coupled to a memory and is configured to electronically receive basic data from a first data source, wherein the basic data includes at least an event identifier, a vendor identifier, a producer identifier, a subscriber identifier, and a supply identifier. The DC computing device is also configured to store the basic data within a database, generate output data based on the basic data, and transmit the output data to a second data source. The DC computing device is further configured to electronically receive input data from the second data source, wherein the input data is based on a selection of a first user from the output data, generate event data based on the output data, and transmit a report to a second user, wherein the report includes the event data.

In another aspect, a computer-implemented method for providing event-planning tools is provided. The method is performed using a data controller (DC) computing device that includes at least one processor in communication with at least one memory device. The method includes electronically receiving basic data from a data source, wherein the basic data includes at least an event identifier, a vendor identifier, a producer identifier, a subscriber identifier, and a supply identifier. The method also includes storing the basic data within a database, generating output data based on the basic data, and transmitting the output data to a data source. The method further includes electronically receiving input data from the data source, wherein the input data is based on a selection of a first user from the output data, generating event data based on the output data, and transmitting a report to a second user, wherein the report includes the event data.

In yet another aspect, a non-transitory computer readable medium that includes executable instructions for providing event-planning tools is provided. When the computer executable instructions are executed by data controller (DC) computing device that includes at least one processor in communication with at least one memory device, the computer executable instructions cause the DC computing device to electronically receive basic data from a first data source, wherein the basic data includes at least an event identifier, a vendor identifier, a producer identifier, a subscriber identifier, and a supply identifier. The computer executable instructions also cause the DC computing device to store the basic data within a database, generate output data based on the basic data, and transmit the output data to a second data source. The computer executable instructions further cause the DC computing device to electronically receive input data from the second data source, wherein the input data is based on a selection of a first user from the output data, generate event data based on the output data, and transmit a report to a second user, wherein the report includes the event data.

BRIEF DESCRIPTION OF THE DRAWINGS

FIG. 1 is a simplified block diagram of an example data controller (DC) system used for providing event-planning tools in accordance with an example embodiment of the present disclosure.

FIG. 2 is an example configuration of a database used by the DC system shown in FIG. 1 in accordance with an embodiment of the present disclosure.

FIG. 3 illustrates an example configuration of user system, such as a data source shown in FIG. 1, in accordance with an embodiment of the present disclosure.

FIG. 4 illustrates an example configuration of the server system shown in FIG. 1, in accordance with an embodiment of the present disclosure.

FIG. 5 is a flow diagram illustrating an example process for providing event-planning tools using the DC system shown in FIG. 1.

FIG. 6 shows a diagram of components of an example data controller (DC) computing device that may be used in the DC system shown in FIG. 1 to providing event-planning tools.

DETAILED DESCRIPTION

Figure 1:
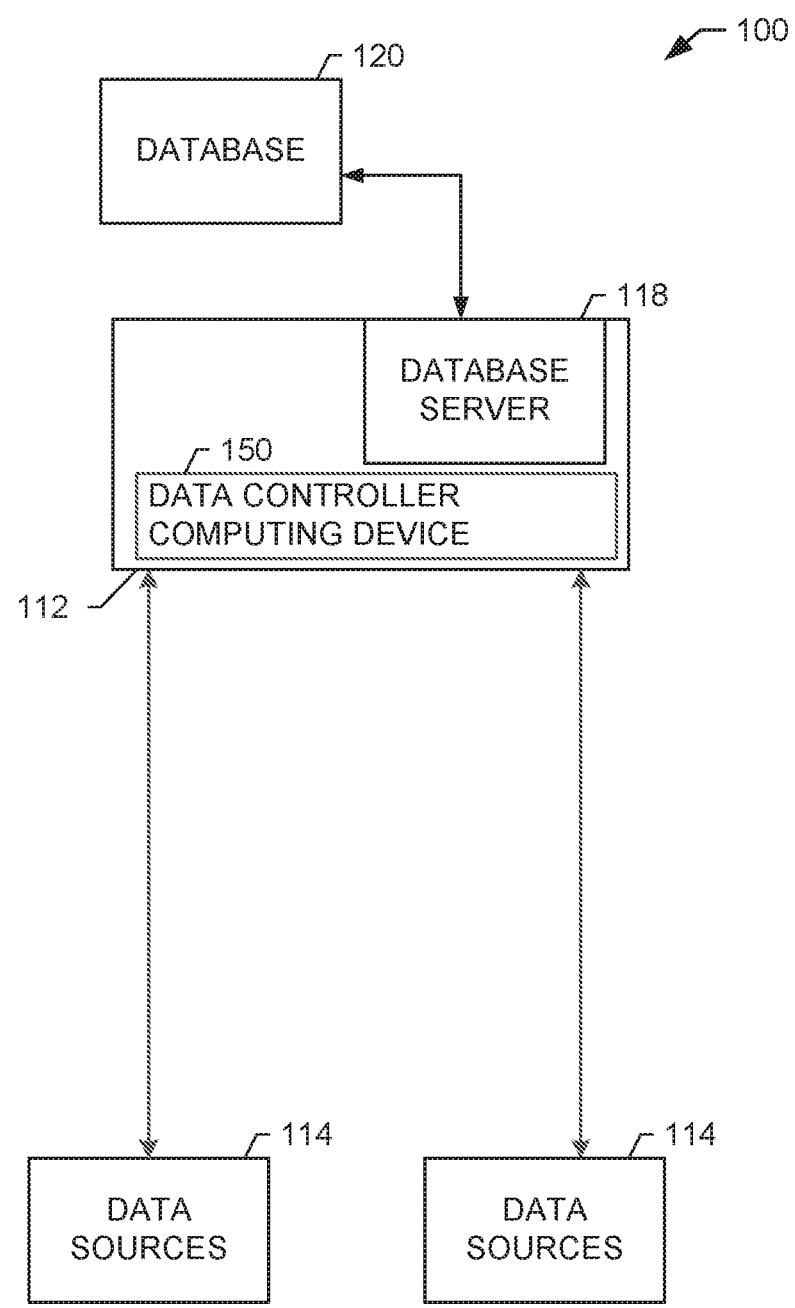
FIGS. 1-6 show example embodiments of the systems and methods described herein.

The following detailed description illustrates embodiments of the invention by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, a web-based infrastructure for enhancing event-planning tools and convenient method to provide electrical-planning tools to users, such as vendors, producers, and/or subscribers as described in more detail below.

The systems and methods described herein include some examples of how the systems and methods may be implemented. These examples are not intended to limit the systems and methods in any way. Rather, these systems and methods are used to provide (i.e., provision) numerous event-planning tools. One event-planning tool that is described herein for example purposes is an electrical-planning tool. However, it is to be understood that the electrical-planning tool is used for illustrative purposes only and is not intended to limit the systems and methods described herein. For example, the systems and methods described herein may be used to provide other event-planning tools, such as event-planning tools associated with event information, such as information related to number and/or types of tables, chairs, tents, and other information associated with an event. As used herein events may include trade shows, fairs, festivals, emergency response situations and other events where the systems and methods described herein may be utilized.

The methods and systems described herein may be implemented using computer programming or engineering techniques including computer software, firmware, hardware or any combination or subset thereof, wherein the technical effects may be achieved by performing one of the following steps: (i) electronically receiving basic data from a data source, wherein the basic data includes at least an event identifier, a vendor identifier, a producer identifier, a subscriber identifier, and a supply identifier; (ii) storing the basic data within a database; (iii) generating output data based on the basic data; (iv) transmitting the output data to a data source; (v) electronically receiving input data from the data source, wherein the input data is based on a selection of a first user from the output data; (vi) generating event data based on the output data; and (vii) transmitting a report to a second user, wherein the report includes the event data.

The systems and methods described herein are configured to facilitate (a) improved accuracy of event information; (b) improved provisioning of event-planning tools; (c) improved preparation for event planning; (d) improved analysis and evaluation speed of event-planning requirements by implementing a specific event-planning tool; and (f) reduced evaluation time of planning requirements by automating or partially automating a process to identify event-planning needs.

Described herein are computer systems such as a data controller (DC) computing device and data sources. As described herein, all such computer systems include a processor and a memory.

Further, any processor in a computing device referred to herein may also refer to one or more processors wherein the processor may be in one computing device or a plurality of computing devices acting in parallel. Additionally, any memory in a computing device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In certain embodiments, the system is run on a Linux® server environment (Linux is the registered trademark of Linus Torvalds in the U.S. and other countries). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

FIG. 1 is a block diagram of an example data controller (DC) system 100 for providing event-planning tools. DC system 100 includes a server 112, any number of data sources, such as data sources 114, and at least one data controller (DC) computing device 150. As used herein, data sources 114 include WebSocket connections, HTTP connections, and the like, and are configured to transmit basic data and input data to DC computing device 150. In some embodiments, data sources 114 may be associated with users inputting basic data and input data feeding DC computing device 150. As described herein, a user may be a vendor (e.g., a participant offering goods and/or services in an event), a producer (e.g., an entity organizing an event, such as an event planner or an emergency response technician), or a subscriber (e.g., an entity providing event supplies based on the information provisioned by the event-planning tool). In the example embodiment, basic data may include event identifiers, event descriptions, vendor identifiers, vendor descriptions, producer identifiers, producer descriptions, subscriber identifiers, subscriber descriptions, supply identifiers, supply descriptions, supply images, and other data enabling DC system 100 to function as described herein. Input data is typically basic data selected by a user. For example, a user, such as a vendor, may select an event (e.g., event identifier) and supplies (e.g., a plurality of supply identifier) that the vendors needs for that event.

Data sources 114 may also include computing devices configured to implement a web browser or a software application, which enables data sources 114 to access server system 112 and, more specifically, DC computing device 150 using the Internet. Data sources 114 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Alternatively, data sources 114 include any device capable of accessing the Internet including, but not limited to, a desktop computer, a laptop computer, a personal digital assistant (PDA), a cellular phone, a smartphone, a tablet, a phablet, or other web-based connectable equipment.

In one embodiment, server system 112 includes a database server 118 that is communicatively coupled to a database 120 for storing data. In an exemplary embodiment, database 120 stores event information from a plurality of data sources 114 and paths based on the input and output event information. As used herein, event information refers to basic data, input data, event data, and output data. Event data includes basic data and input data, and is generated by DC computing device based on the basic data and the input data. More specifically, DC computing device matches the basic data to the input data and stores the event data in an event data table, as described in further detail below. Output data includes event data and is filtered by DC computing device 150 based on a user identifier, such as a subscriber identifier, a vendor identifier, or a producer identifier.

According to the exemplary embodiment, database 120 is disposed remotely from server system 112. In other embodiments, database 120 is decentralized, or may be a portion of server system 112. In the exemplary embodiment, a user is able to access database 120 through data sources 114 by logging onto server system 112. In one embodiment, database 120 includes an event table, a vendor table, a producer table, a subscriber table, and a supply table. The event table is configured to store information associated with an event (e.g., basic event records such as event identifier, event date, event time, event type, and the like, and event records such as vendor identifier, producer identifier, subscriber identifier, and/or supply identifier). The vendor table is configured to store information associated with vendors (e.g., vendor identifier, vendor name, vendor status, vendor username, vendor encrypted password, vendor login times, vendor address, vendor phone number, vendor email, supply identifier required vendor, and the like). The producer table is configured to store information associated with producers (e.g., producer identifier, producer name, producer status, producer username, producer encrypted password, producer login times, producer address, producer contact, producer phone number, producer email address, and the like). The subscriber table is configured to store information associated with subscribers (e.g., subscriber identifier, subscriber name, subscriber status, subscriber username, subscriber encrypted password, subscriber login times, subscriber address, subscriber contact, subscriber phone number, subscriber email address, and the like). The supply table is configured to store information associated with the supplies (e.g., supply identifier, supply type, supply description, supply amount, supply image, and the like). DC computing device 150 is configured to query (e.g., SQL queries, API calls) database 120 and receive query responses from database 120.

In another embodiment, DC computing device 150 includes a web server processing view requests. For example, DC computing device 150 may receive a view request from data source 114 (e.g., a producer requesting to see the vendors attending one or more events) and may transmit a HTML response over HTTP, including instructions to render a webpage including the output event data.

In the example embodiment, DC computing device 150 is accessed by a data source 114 associated with a user, such as a subscriber. The subscriber inputs basic data into data source 114, which transmits the basic data to DC computing device 150. DC computing device 150 is configured to store the basic data into database 120 DC computing device 150 is configured to provide an HTTP based API (i.e., Web API) to a computing device, such as a data source 114. For example, DC computing device 150 may receive an API request including a user identifier (e.g., a vendor identifier, a producer identifier, and/or a subscriber identifier) from a data source 114 associated with a user (e.g., a vendor, a producer, and/or a subscriber) and, in response to the request, DC computing device 150 may transmit an API response including associated output event data as an XML file to data source 114. The output data may include one or more event identifiers, one or more supply identifiers, an image associated with the one or more supply identifiers, or other output data that data source 114 may request. Once the output data is received by data source 114, DC computing device 150 may instruct data source 114 to display the output in different ways.

In one example, data source 114 displays output data in the form of a dropdown and the supplies in the form of images that may be selected by a vendor. In another example, data source 114 displays the output data in the form of dropdowns where the vendor may select the output data (i.e., supplies the vendor requires for a particular event). The selection made by the vendor may also be referred to as input data. In yet another example, data source 114 displays output data, such as a list of vendors, to a producer. In this example, the producer may select output data, such as add one or more vendors to a particular event that the producer is organizing. Once the producer has done selecting the output data, data source 114 generates input data and transmits the input data to DC computing device 150. Based on the input data and basic data, DC computing device 150 generates event data that DC computing device stores in the event table. In certain embodiments, data sources 114 are associated with a source identifier, such as an IP address, username, or serial number. In one embodiment, source identifiers further include an access level, identifying the type of information a user associated with a data source 114 may have access to. For example, a source identifier may indicate producer A has access to information associated with events X and Y, but producer A does not have access to information associated with events W and Z. Data sources 114 may receive output event data from DC computing device 150.

In some embodiments, DC computing device 150 includes a message queue, storing input data as it is received from data sources 114. Then, DC computing device generates event data based on the input data and the basic data. The event data may be retrieved by a user, of DC system 100. In one example, subscribers may access DC computing device 150 and retrieve event data to evaluate the supply requirement for a specific event and/or vendor. In another example, a producer may access DC computing device 150 to identify and/or verify vendors participating in an event.

Additionally or alternatively, DC computing device 150 includes an image processing computing device generating images from the basic data and/or event data. For example, SC computing device 150 may include a HTTP-based API connection transmitting output data to data sources 114 as the image processing computing device generates images associated with the basic data and/or event data.

In the example embodiment, DC computing device 150 receives basic data from a data source 114 associated with a subscriber and stores the basic data in a database, such as database 120. Database 120 may partition into tables, such as an event table, a vendor table, a producer table, a subscriber table, and a supply table. DC computing device 150 is configured to parse the basic data and store the parsed basic data in the corresponding table.

DC computing device 150 is also configured to generate reports based on event data. DC computing device 150 may query database 120 to retrieve information to be displayed in the report. DC computing device 150 may customize the reports based on user input. For example, a vendor may only want to see in the report the supplies that the vendor needs for a specific event, whereas a producer may only want to see in the report the vendors participating in one or more events and a subscriber may want to see all the vendors participating in each event and the supplies each vendor needs. The subscriber may also want to see in the report the supply in stock.

In other embodiments, DC system 100 may include additional, fewer, or alternative devices, including those described herein.

Figure 2:
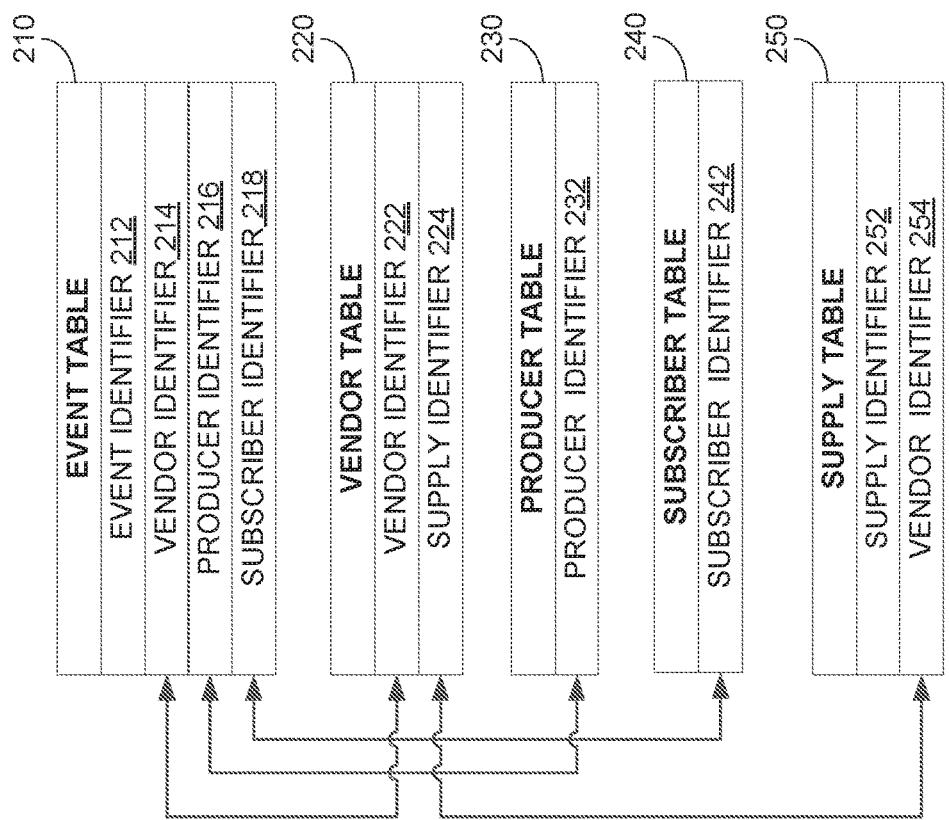

FIG. 2 depicts an example configuration of database 120, included in DC system 100 (shown in FIG. 1). Database 120 includes, at least, event table 210, vendor table 220, producer table 230, subscriber table 240, and supply table 250. Event records in event table 210 are uniquely identified by an event identifier 212. Vendor records in vendor table 220 are uniquely identified by a vendor identifier 222. Producer records in producer table 230 are uniquely identified by a producer identifier 222. Subscriber records in subscriber table 240 are uniquely identified by a subscriber identifier 242. Supply records in supply table 250 are uniquely identified by a supply identifier 252. In some embodiments, identifiers are generated by database 120. Additionally or alternatively, identifiers may be generated by DC computing device 150 (shown in FIG. 1) based on event data transmitted by data sources 114 (shown in FIG. 1).

In the example embodiment, event records in event table 210 include vendor identifier 214, producer identifier 216, and subscriber identifier 218. In this embodiment, event records are associated with vendor records, producer records, and subscriber records. More specifically, vendor identifier 214, producer identifier 216, and subscriber identifier 218 are associated with vendor identifier 222, producer identifier 232, and subscriber identifier 242, respectively. In some embodiments, event records include a supply identifier that is associated with supply identifier 252.

DC computing device 150 is configured to generate event records in event table 210 based on event data. As described above, DC computing device 150 is configured to parse event data and store the parsed data in the corresponding table. For example, a subscriber may submit via data source 114 (shown in FIG. 1) event data including event information (e.g., event records), vendor information (e.g., vendor records), producer information (e.g., a producer records), subscriber information (e.g., subscriber records), and/or supply information (e.g., supply records) to DC computing device 150. DC computing device 150 receives the event data, parses the event data and stores the parsed event data in the corresponding table. In this example, DC computing device 150 stores the event information in event table 210, the vendor information in vendor table 220, the producer information in producer table 230, the subscriber information in subscriber table 240, and the supply information in supply table 250.

The event records generated by DC computing device 150 may include vendor identifier 214, producer identifier 216, and subscriber identifier 218. The event records may also include a supply identifier. By generating the event records, DC computing device 150 is able to determine the vendor records, the producer records, the subscriber records, and the supply records associated with every event (i.e., each event identifier stored in event table 210. DC computing device 150 is configured to display the basic event records (i.e., basic data) and the event records (i.e., event data) to a user. DC computing device 150 is also configured to display the basic event records and the event records based on predefined user settings. For example, DC computing device 150 may grant specific access to a user based on an identifier. That is, DC computing device 150 may only grant access to a vendor to the events and supplies associated with the vendor.

Figure 3:
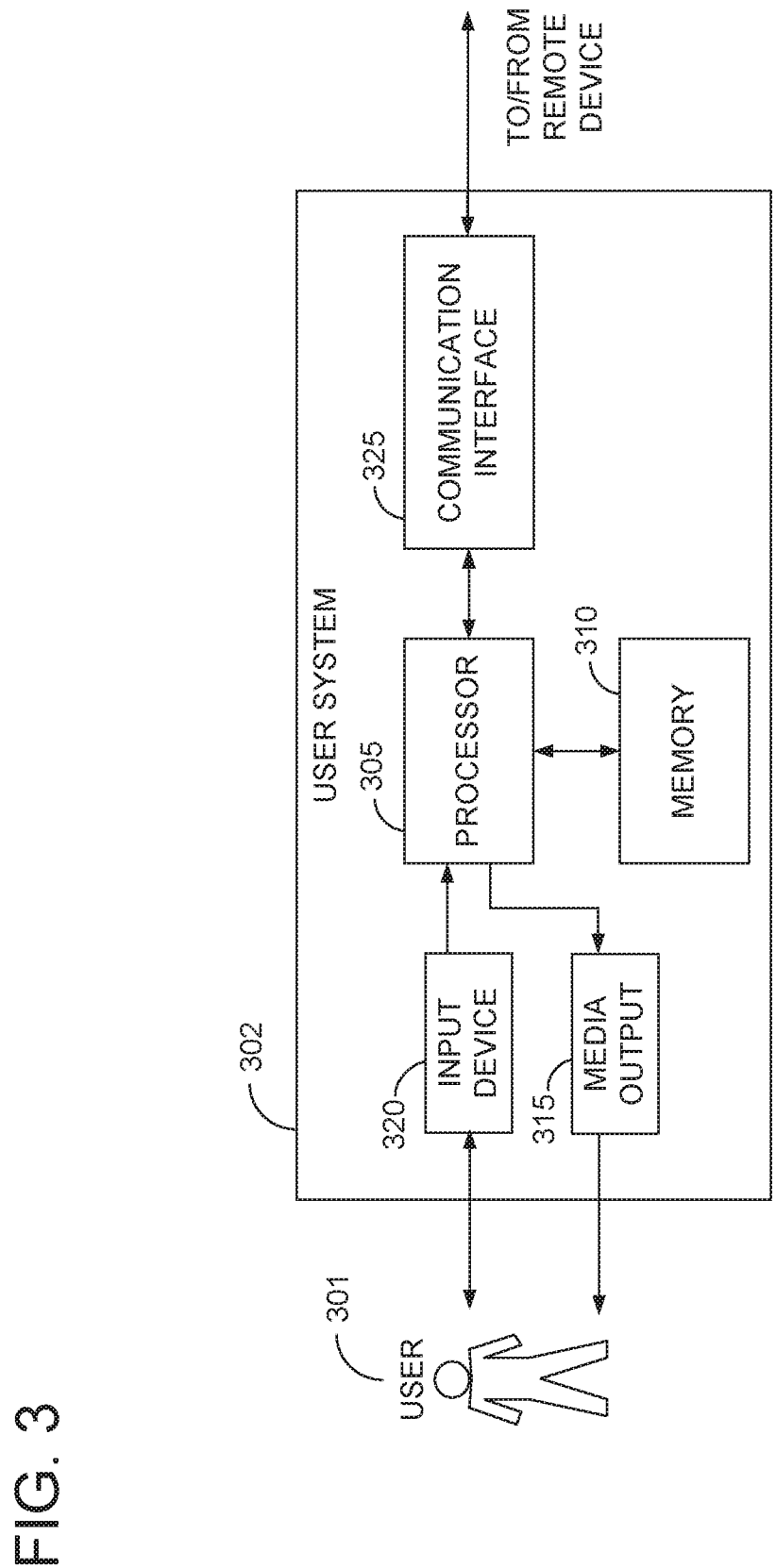

FIG. 3 illustrates an example configuration of a user system 302, such as data sources 114 (shown in FIG. 1) configured to transmit data to DC computing device 150 (shown in FIG. 1). User system 302 may include, but is not limited to, data sources 114. In the example embodiment, user system 302 includes a processor 305 for executing instructions. In some embodiments, executable instructions are stored in a memory 310. Processor 305 may include one or more processing units, for example, a multi-core configuration. Memory 310 is any device allowing information such as executable instructions and/or written works to be stored and retrieved. Memory 310 may include one or more computer readable media.

User system 302 also includes at least one media output component 315 for presenting information to user 301. User 301 may include, but is not limited to, vendors, producers, and subscribers. Media output component 315 is any component capable of conveying information to user 301. For example, media output component 315 may be a display component configured to display component lifecycle data in the form of reports, dashboards, communications, and the like. In some embodiments, media output component 315 includes an output adapter such as a video adapter and/or an audio adapter. An output adapter is operatively coupled to processor 305 and operatively connectable to an output device, such as a display device, a liquid crystal display (LCD), organic light emitting diode (OLED) display, or "electronic ink" display, or an audio output device, a speaker or headphones.

In some embodiments, user system 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, a iris reader/scanner, a retina reader/scanner, a profile scanner, or the like. A single component, such as a touch screen, may function as both an output device of media output component 315 and input device 320. A single component, such as a touch screen, may function as both an output device of media output component 315 and input device 320. User system 302 may also include a communication interface 325, which is communicatively connectable to a remote device such as server system 112 (shown in FIG. 1). Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory 310 are, for example, computer readable instructions for providing a user interface to user 301 via media output component 315 and, optionally, receiving and processing input from input device 320. A user interface may include, among other possibilities, a web browser, and client application. Web browsers enable users, such as user 301, to display and interact with media and other information typically embedded on a web page or a website from server system 112. A client application allows user 301 to interact with a server application from server system 112.

Figure 4:
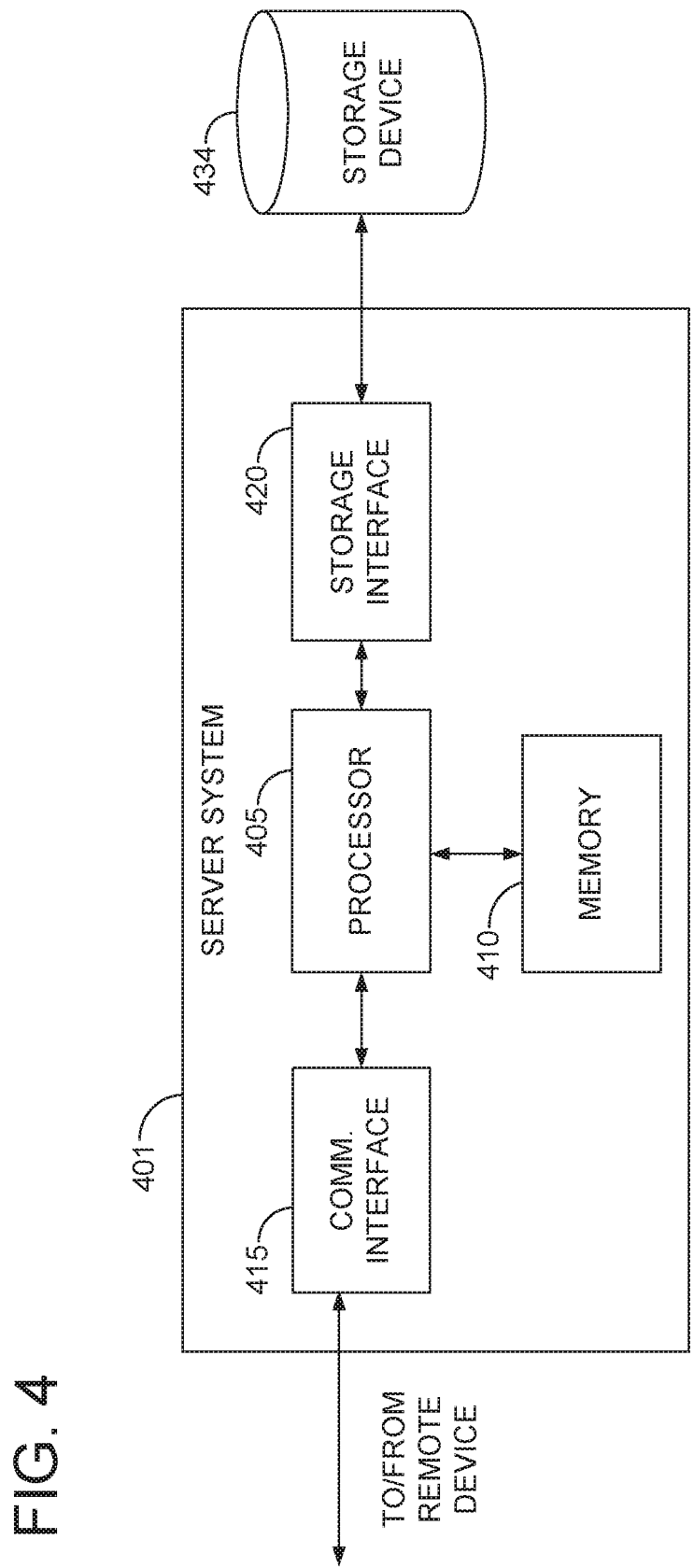

FIG. 4 illustrates an example configuration of a server system 401 such as the server system 112 (shown in FIG. 1) that includes DC computing device 150 (shown in FIG. 1). Server system 401 may include, but is not limited to, database server 118 (shown in FIG. 1) and/or DC computing device 150. In some embodiments, server system 401 is similar to server system 112.

Server system 401 includes a processor 405 for executing instructions. Instructions may be stored in a memory 410, for example. Processor 405 may include one or more processing units (e.g., in a multi-core configuration) for executing instructions. The instructions may be executed within a variety of different operating systems on the server system 401, such as UNIX, LINUX, Microsoft Windows®, etc. More specifically, the instructions may cause various data manipulations on data stored in storage device 434 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 405 is operatively coupled to a communication interface 415 such that server system 401 is capable of communicating with a remote device, such as a user system or another server system 401. For example, communication interface 415 may receive communications from data sources 114 via network connections, as illustrated in FIG. 1.

Processor 405 may also be operatively coupled to a storage device 434. Storage device 434 is any computer-operated hardware suitable for storing and/or retrieving data. In some embodiments, storage device 434 is integrated in server system 401. In other embodiments, storage device 434 is external to server system 401 and is similar to database 120 (shown in FIG. 1). For example, server system 401 may include one or more hard disk drives as storage device 434. In other embodiments, storage device 434 is external to server system 401 and may be accessed by a plurality of server systems 401. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Memory 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
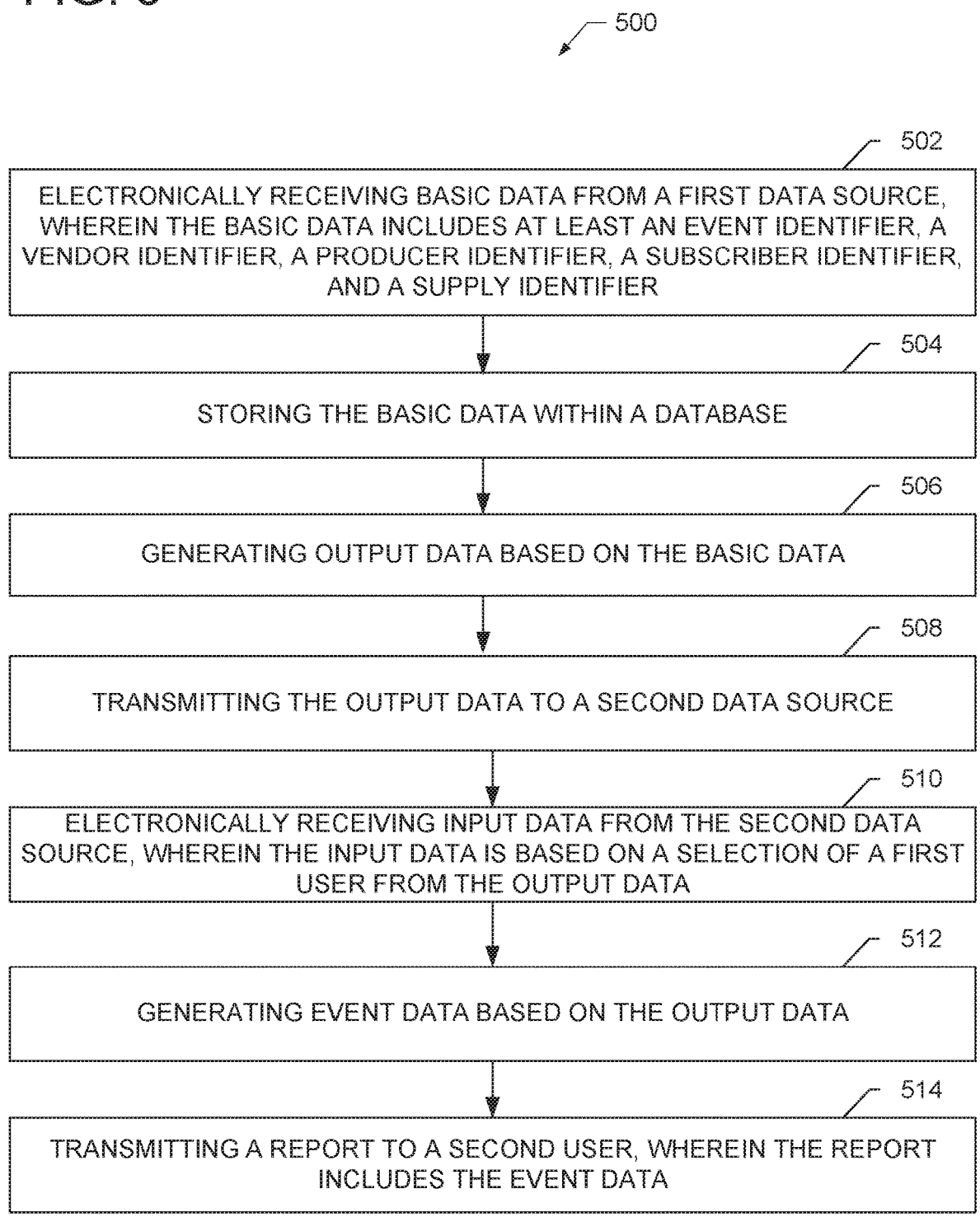

FIG. 5 is an example flow diagram illustrating a method flow 500 by which a DC computing device 150 (shown in FIG. 1) provides event-planning tools. Method 500 includes electronically receiving 502 basic data from a first data source, wherein the basic data includes at least an event identifier, a vendor identifier, a producer identifier, a subscriber identifier, and a supply identifier. Method 500 also includes storing 504 the basic data within a database, generating 506 output data based on the basic data, and transmitting 508 the output data to a second data source. Method 500 further includes electronically receiving 510 input data from the second data source, wherein the input data is based on a selection of a first user from the output data, generating 512 event data based on the output data, and transmitting 514 a report to a second user, wherein the report includes the event data.

Figure 6:
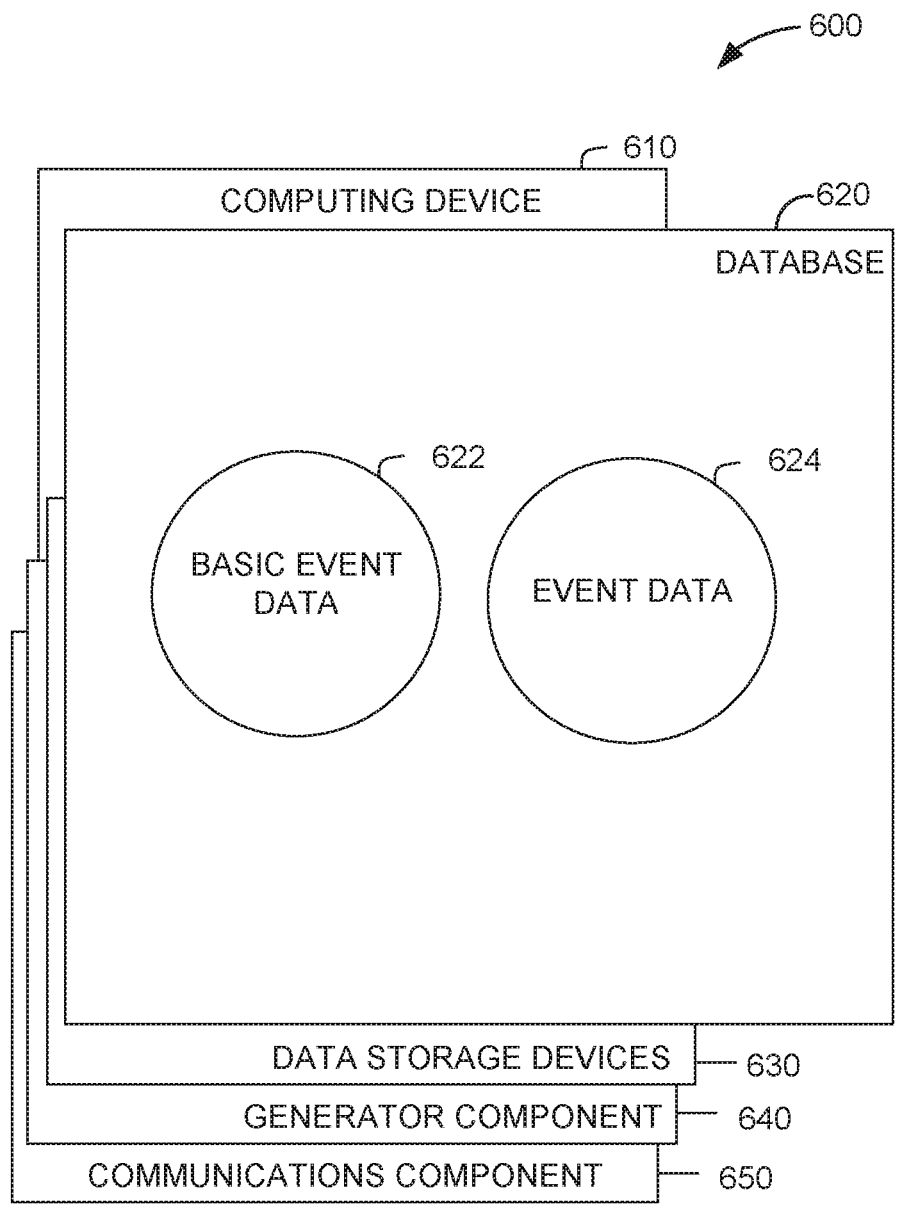

FIG. 6 is a diagram 600 of components of one or more example computing devices that may be used in DC system 100 shown in FIG. 1. In some embodiments, computing device 610 is similar to DC computing device 150 (shown in FIG. 1). Database 620 may be coupled with several separate components within computing device 610, which perform specific tasks. In this embodiment, database 620 includes basic data 622 and event data 624. In some embodiments, database 620 is similar to database 120 (shown in FIG. 1).

Computing device 610 includes database 620, as well as data storage devices 630 for storing data within database 620, such as storing 504 (shown in FIG. 5) basic data within database 620. Computing device 610 also includes a generator component 640 for generating 506 output data based on the basic data and generating 512 event data based on output data (both shown in FIG. 5). Computing device 610 also includes a communications component 650 for electronically receiving 502 the basic data from a first data source, transmitting 508 the output data to a second data source, and electronically receiving 510 input data from the second data source.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible and fast system for various aspects of fraud analysis for registration of merchants with acquirer banks. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the DC computing device are described herein as including general processing and memory devices, it should be understood that the onboarding computing device is a specialized computer configured to perform the steps described herein for providing event-planning tools.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A data controller (DC) computing system for providing event-planning tools, the DC computing system comprising at least one data controller (DC) computing device comprising a processor and a memory communicatively coupled to the processor, the DC computing device configured to:
    electronically receive basic data from a first data source, wherein the basic data includes at least an event identifier, a vendor identifier, a producer identifier, a subscriber identifier, and a supply identifier;
    store the basic data within a database;
    generate output data based on the basic data;
    receive a request for the output data from a second data source associated with a source identifier, wherein the source identifier includes an access level identifying information included in the output data that is accessible by the second data source;
    cause to display on the second data source the information accessible by the second data source, wherein the displayed information is selectable via the second data source;
    electronically receive input data from the second data source, wherein the input data is based on a selection of one or more data points included in the displayed information;
    generate event data based on the input data; and
    transmit a report to the second data source, wherein the report includes the event data.

2. The DC computing system of claim 1, wherein the database includes an event table indexed using the event identifier, a vendor table indexed using the vendor identifier, a producer table indexed using the producer identifier, a subscriber table indexed using the subscriber identifier, and a supply table indexed using the supply identifier.

3. The DC computing system of claim 2, wherein the event table includes the generated event data.

4. The DC computing system of claim 2, wherein generating the event data further includes instructions to associate the vendor identifier, the producer identifier, and the subscriber identifier to the event table.

5. The DC computing system of claim 1 further configured to map the basic data using at least one of the event identifier, the vendor identifier, the producer identifier, the subscriber identifier, and the supply identifier.

6. The DC computing system of claim 1, wherein the database includes instructions include at least one SQL query.

7. The DC computing system of claim 1, wherein the at least one of the basic data and the input data is received using a Web Socket connection.

8. A computer-implemented method for providing event-planning tools, the method implemented using at least one data controller (DC) computing device in communication with a memory, the method comprising:
    electronically receiving basic data from a first data source, wherein the basic data includes at least an event identifier, a vendor identifier, a producer identifier, a subscriber identifier, and a supply identifier;
    storing the basic data within a database;
    generating output data based on the basic data;

receiving a request for the output data from a second data source associated with a source identifier, wherein the source identifier includes an access level identifying information included in the output data that is accessible by the second data source;

causing to display on the second data source the information accessible by the second data source, wherein the displayed information is selectable via the second data source;

electronically receiving input data from the second data source, wherein the input data is based on a selection of one or more data points included in the displayed information;

generating event data based on the input data; and transmitting a report to the second data source, wherein the report includes the event data.

9. The method of claim 8, wherein the database includes an event table indexed using event identifiers, a vendor table indexed using the vendor identifier, a producer table indexed using the producer identifier, a subscriber table indexed using the subscriber identifier, and a supply table indexed using the supply identifier.

10. The method of claim 9, wherein the event table includes the generated event data.

11. The method of claim 9, wherein generating the event data further includes instructions to associate the vendor identifier, the producer identifier, and the subscriber identifier to the event table.

12. The method of claim 8 further comprising mapping the basic data using at least one of the event identifier, the vendor identifier, the producer identifier, the subscriber identifier, and the supply identifier.

13. The method of claim 8, wherein the database includes instructions include at least one SQL query.

14. The method of claim 8, wherein the at least one of the basic data and the input data is received using a Web Socket connection.

15. A non-transitory computer-readable storage media having computer-executable instructions embodied thereon, wherein when executed by an data controller (DC) computing device having at least one processor coupled to at least one memory device, the computer-executable instructions cause the processor to:

electronically receive basic data from a first data source, wherein the basic data includes at least an event identifier, a vendor identifier, a producer identifier, a subscriber identifier, and a supply identifier;

store the basic data within a database;

generate output data based on the basic data;

receive a request for the output data from a second data source associated with a source identifier, wherein the source identifier includes an access level identifying information included in the output data that is accessible by the second data source;

cause to display on the second data source the information accessible by the second data source, wherein the displayed information is selectable via the second data source;

electronically receive input data from the second data source, wherein the input data is based on a selection of one or more data points included in the displayed information;

generate event data based on the input data; and transmit a report to the second data source, wherein the report includes the event data.

16. The computer-executable instructions of claim 15, wherein the database includes an event table indexed using the event identifier, a vendor table indexed using the vendor identifier, a producer table indexed using the producer identifier, a subscriber table indexed using the subscriber identifier, and a supply table indexed using the supply identifier.

17. The computer-executable instructions of claim 16, wherein the event table includes the generated event data.

18. The computer-executable instructions of claim 16, wherein generating the event data further includes instructions to associate of the vendor identifier, the producer identifier, and the subscriber identifier to the event table.

19. The computer-executable instructions of claim 15 further cause the processor to map the basic data using at least one of the event identifier, the vendor identifier, the producer identifier, the subscriber identifier, and the supply identifier.

20. The computer-executable instructions of claim 15, wherein the at least one of the basic data and the input data is received using a Web Socket connection.

* * * * *